US012627579B2

(12) United States Patent
Azadiabad et al.

(10) Patent No.: US 12,627,579 B2
(45) Date of Patent: May 12, 2026

(54) AVAILABILITY AND FAILURE RATE OF VIRTUAL NETWORK FUNCTIONS

(71) Applicants: Siamak Azadiabad, Montreal (CA); Maria Toeroe, Montreal (CA); Ferhat Khen-Dek, Montreal (CA); TELEFONAKTIEBOLAGET LM ERICSSON (PUBL), Stockholm (SE)

(72) Inventors: Siamak Azadiabad, Montreal (CA); Maria Toeroe, Montreal (CA); Ferhat Khendek, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

(21) Appl. No.: 18/546,713

(22) PCT Filed: Mar. 10, 2022

(86) PCT No.: PCT/IB2022/052170
§ 371 (c)(1),
(2) Date: Aug. 16, 2023

(87) PCT Pub. No.: WO2022/190037
PCT Pub. Date: Sep. 15, 2022

(65) Prior Publication Data
US 2024/0137292 A1    Apr. 25, 2024
US 2024/0235962 A9    Jul. 11, 2024

Related U.S. Application Data

(60) Provisional application No. 63/159,224, filed on Mar. 10, 2021.

(51) Int. Cl.
H04L 41/5054    (2022.01)
H04L 41/0895    (2022.01)
H04L 41/40    (2022.01)

(52) U.S. Cl.
CPC ...... H04L 41/5054 (2013.01); H04L 41/0895 (2022.05); H04L 41/40 (2022.05)

(58) Field of Classification Search
CPC .. H04L 41/0895; H04L 41/40; H04L 41/5054
(Continued)

(56) References Cited

U.S. PATENT DOCUMENTS 9,645,899 B1 *   5/2017   Felstaine ............. H04L 41/0897
10,664,297 B2 *   5/2020   Bruun .................... H04L 41/50
(Continued)

FOREIGN PATENT DOCUMENTS

WO    2018162970 A1    9/2018
WO    2022038446 A1    2/2022

OTHER PUBLICATIONS

A. Ali, "Failure Rate Analysis," Dec. 2017.
(Continued)

*Primary Examiner* — Wing F Chan
*Assistant Examiner* — Leon Y Tseng
(74) *Attorney, Agent, or Firm* — Julie Dufort; Ericsson Canada Inc.

(57)      ABSTRACT

There is provided a method, apparatus and non-transitory computer readable media for designing and deploying a network service (NS) meeting availability requirements. The method comprises computing availabilities and failure rates of virtual network functions (VNFs) instances available for deploying the NS. The method comprises designing the NS by defining redundancy and placement of constituents of VNFs instances, using the computed availabilities and failure rates of the VNFs instances. The method comprises deploying the NS.

24 Claims, 8 Drawing Sheets

(58) Field of Classification Search

USPC ......................................................... 709/226

See application file for complete search history.

(56)                    References Cited

U.S. PATENT DOCUMENTS

| | | | | |
|---|---|---|---|---|
| 2018/0191607 | A1* | 7/2018 | Kanakarajan | ......... H04L 45/586 |
| 2018/0307539 | A1* | 10/2018 | Celozzi | .............. G06F 11/0712 |
| 2019/0109766 | A1* | 4/2019 | Bodog | ................ H04L 41/5096 |
| 2020/0382374 | A1* | 12/2020 | Yi | ........................... H04L 41/40 |
| 2021/0226743 | A1* | 7/2021 | Oi | ............................. H04L 1/22 |

OTHER PUBLICATIONS

A. Hmaity et al., "Virtual Network Function placement for resilient Service Chain provisioning," in 8th International Workshop on Resilient Networks Design and Modeling (RNDM), Halmstad, Sweden , 2016.

A. Immonen et al., "Survey of reliability and availability prediction methods from the viewpoint of software architecture," Softw Syst Model, vol. 7, pp. 49-65, 2008.

E. Ruijters et al., "Fault tree analysis: A survey of the state-of-the-art in modeling, analysis and tools," Computer Science Review, vols. 15-16, pp. 29-62, 2015.

ETSI GS NFV-IFA 007 V3.4.1: "Management and Orchestration; Or-Vnfm reference point—Interface and Information Model Specification," Jun. 2020.

ETSI GS NFV-IFA 011 V4.1.1: Management and Orchestration; VNF Descriptor and Packaging Specification, Nov. 2020.

ETSI, "Network Functions Virtualisation (NFV); Reliability; Report on Models and Features for End-to-End Reliability", GS NFV-REL 003 V1.1.2 (Jul. 2016).

G. Moualla et al., "An Availability-aware SFC placement Algorithm for Fat-Tree Data Centers," in 7th International Conference on Cloud Networking (CloudNet), Tokyo, 2018.

Guto Leoni Santos et al.: "The Greatest Teacher, Failure is—Using Reinforcement Learning for SFC Placement Based on Availability and Energy Consumption", Cornell University Library, NY, Nov. 18, 2020.

J. Kong et al., "Guaranteed-Availability Network Function Virtualization with Network Protection and VNF Replication," in GLOBECOM, Singapore, 2017.

L. Fang et al., "Reliability-aware virtual network function placement in carrier networks," Journal of Network and Computer Applications, vol. 154, 2020.

L. Qu et al., "A Reliability-Aware Network Service Chain Provisioning With Delay Guarantees in NFV-Enabled Enterprise Datacenter Networks," IEEE Transactions on Network and Service Management, vol. 14, No. 3, pp. 554-568, 2017.

ReliaWiki, "Fault Tree Diagrams and System Analysis," reliawiki, Nov. 2019.

W. Ding et al., "Enhancing the reliability of services in NFV with the cost-efficient redundancy scheme," in IEEE International Conference on Communications (ICC), Paris, France, 2017.

Yanal Alahmad et al.: "VNF Placement Strategy for Availability and Reliability of Network Services in NFV", 2019 6th. International Conference on Software Defined Systems (SDS), IEEE, Jun. 10, 2019, pp. 284-289.

International Search Report and Written Opinion for PCT/IB2022/052170, mailing date May 19, 2022.

* cited by examiner

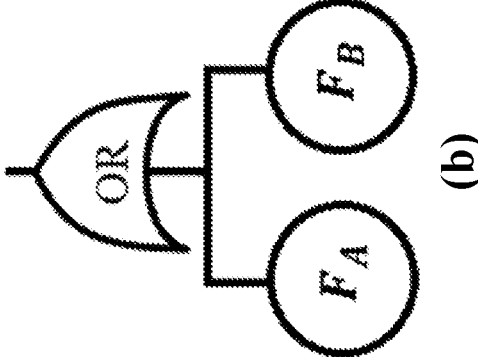
(b)
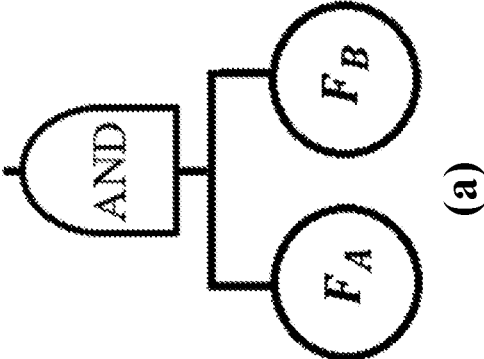
(a)
Figure 2

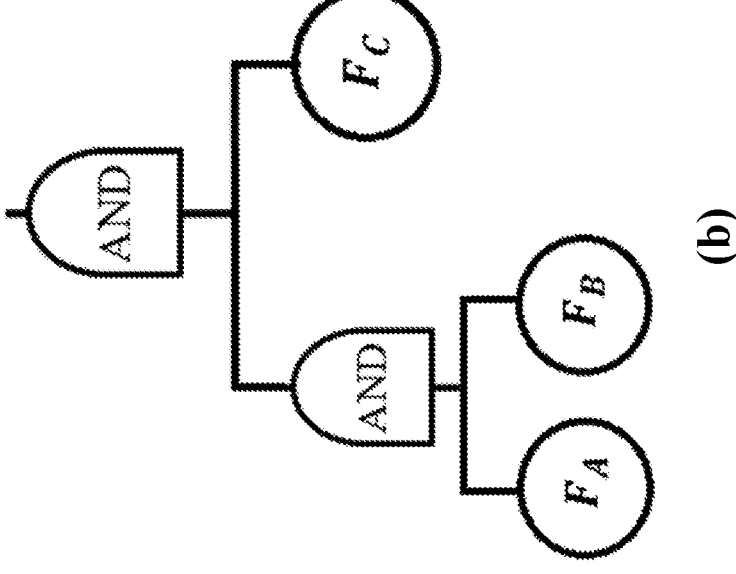
(b)
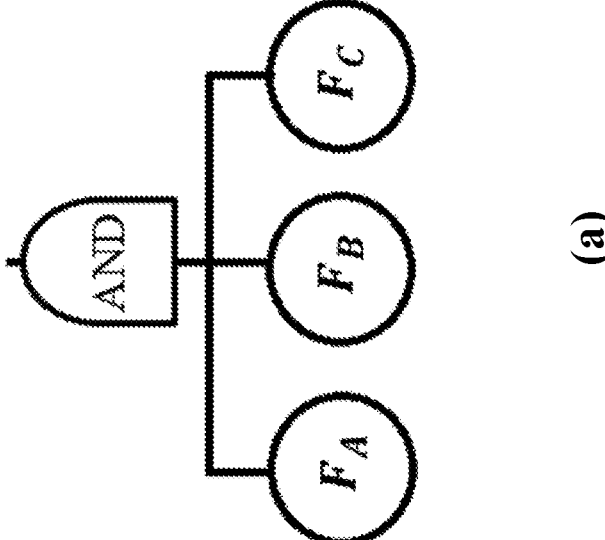
(a)
Figure 3

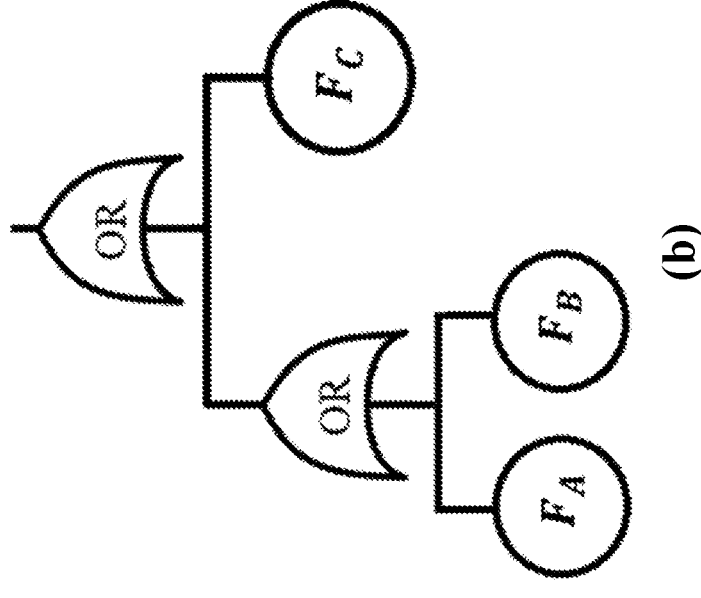
(b)
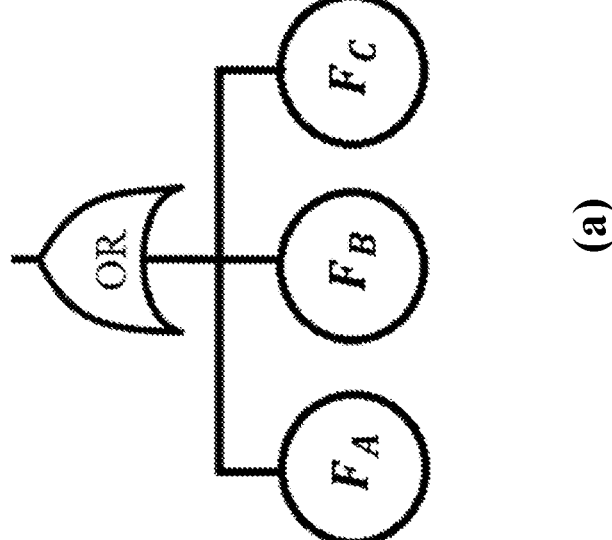
(a)
Figure 4

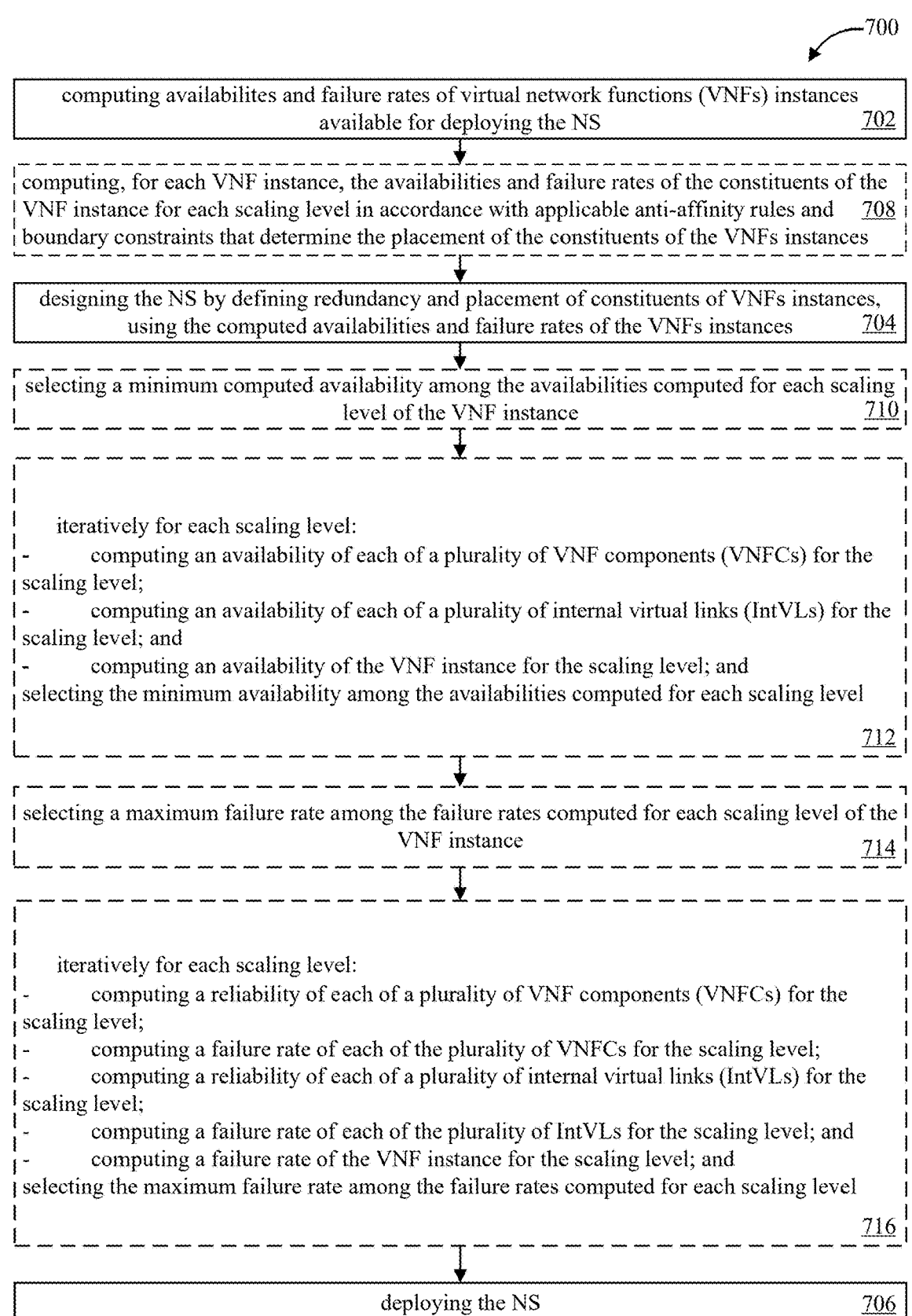

700 computing availabilites and failure rates of virtual network functions (VNFs) instances available for deploying the NS 702 computing, for each VNF instance, the availabilities and failure rates of the constituents of the VNF instance for each scaling level in accordance with applicable anti-affinity rules and 708 boundary constraints that determine the placement of the constituents of the VNFs instances designing the NS by defining redundancy and placement of constituents of VNFs instances, using the computed availabilities and failure rates of the VNFs instances 704 selecting a minimum computed availability among the availabilities computed for each scaling level of the VNF instance 710 iteratively for each scaling level:
-       computing an availability of each of a plurality of VNF components (VNFCs) for the scaling level;
-       computing an availability of each of a plurality of internal virtual links (IntVLs) for the scaling level; and
-       computing an availability of the VNF instance for the scaling level; and
selecting the minimum availability among the availabilities computed for each scaling level

712 selecting a maximum failure rate among the failure rates computed for each scaling level of the VNF instance 714 iteratively for each scaling level:
-       computing a reliability of each of a plurality of VNF components (VNFCs) for the scaling level;
-       computing a failure rate of each of the plurality of VNFCs for the scaling level;
-       computing a reliability of each of a plurality of internal virtual links (IntVLs) for the scaling level;
-       computing a failure rate of each of the plurality of IntVLs for the scaling level; and
-       computing a failure rate of the VNF instance for the scaling level; and
selecting the maximum failure rate among the failure rates computed for each scaling level

716 deploying the NS 706

Figure 7

AVAILABILITY AND FAILURE RATE OF VIRTUAL NETWORK FUNCTIONS

PRIORITY STATEMENT UNDER 35 U.S.C. S.119(E) & 37 C.F.R. S.1.78

This non-provisional patent application claims priority based upon the prior U.S. provisional patent application entitled "AVAILABILITY AND FAILURE RATE OF VIRTUAL NETWORK FUNCTIONS", application No. 63/159, 224, filed Mar. 10, 2021, in the names of Azadiabad et al.

TECHNICAL FIELD

The present disclosure relates to the design and deployment of network services.

BACKGROUND

In the context of Network Function Virtualization (NFV), network functions are provided by Virtual Network Functions (VNF) or by Physical Network Functions (PNF). A Network Service (NS) is the composition of VNFs, PNFs, and/or other NSs that are interconnected by Virtual Links (VL). A VNF is a software implementation of a network function, which is composed of at least one VNF Component (VNFC) and zero, one, or many Internal VLs (IntVL). The VNFCs are the real consumers of the infrastructure resources (e.g., computing and storage resources).

A VNF vendor designs and structures the VNF application into VNFCs and specifies the required virtual resources. For each VNF, the vendor creates a VNF Descriptor (VNFD) with its virtual deployment units (VDU). The VNFD also defines VNF Deployment Flavors (VnfDF) to indicate the deployment, connectivity, and virtualized resource requirements of its instances. A VNF is instantiated based on one of its VnfDFs. A VnfDF includes one or many VDU profiles (i.e., VduProfile information element) one for each VNFC, and VL profiles (i.e., VirtualLinkProfile information element) one for each IntVLs. VnfDFs can include affinity and/or anti-affinity rules for the placement of VNFC and IntVL instances. Also, a VnfDF defines scaling levels of the VNF which indicates the number of instances for each VNFC and IntVL at different scaling levels.

SUMMARY

The availability of a system is defined as the fraction of time the system, a VNF for instance, can deliver its service (or functionality) during a given period. Therefore, the availability of a VNF functionality depends on the outage time of the functionality that the VNF provides. The outage time of the VNF functionality in turn depends on the failure rate of the VNF instance(s) providing it, the failure detection time, and the failure recovery time. There is a need for a method to determine these attributes of the VNF instances as dynamic composite entities. The number of redundant instances for a VNF, if needed, is also determined based on the availability of those instances. Those are needed to be able to design and deploy NSs meeting availability requirements.

There is provided a method for designing and deploying a network service (NS) meeting availability requirements. The method comprises computing availabilities and failure rates of virtual network functions (VNFs) instances available for deploying the NS. The method comprises designing the NS by defining redundancy and placement of constituents of VNFs instances, using the computed availabilities and failure rates of the VNFs instances. The method comprises deploying the NS.

There is provided an apparatus operative to design and deploy a network service (NS) meeting availability requirements. The apparatus comprises processing circuits and a memory, the memory containing instructions executable by the processing circuits whereby the apparatus is operative to compute availabilities and failure rates of virtual network functions (VNFs) instances available for deploying the NS. The apparatus is operative to design the NS by defining redundancy and placement of constituents of VNFs instances, using the computed availabilities and failure rates of the VNFs instances. The apparatus is operative to deploy the NS.

There is provided a non-transitory computer readable media having stored thereon instructions for designing and deploying a network service (NS) meeting availability requirements. The instructions comprise computing availabilities and failure rates of virtual network functions (VNFs) instances available for deploying the NS. The instructions comprise designing the NS by defining redundancy and placement of constituents of VNFs instances, using the computed availabilities and failure rates of the VNFs instances. The instructions comprise deploying the NS. The instructions comprise any of the steps described herein.

The methods and apparatus provided herein present improvements to the way design and deployment of network service (NS) operate.

BRIEF DESCRIPTION OF THE DRAWINGS

FIGS. 2a and b are fault tree diagrams (FTDs) of a system with two components: a) the system fails if A and B fail; b) the system fails if A or B fails.

FIGS. 3a and b are fault tree diagrams of a system with three components which fails if all components fail at the same time: a) three events with one AND gate; b) three events with two AND gates.

FIGS. 4a and b are fault tree diagrams of a system with three components which fails if at least one component fails: a) three events with one OR gate; b) three events with two OR gates.

FIG. 7 is a flowchart of a method for designing and deploying a network service (NS) meeting availability requirements.

DETAILED DESCRIPTION

Figure 1:
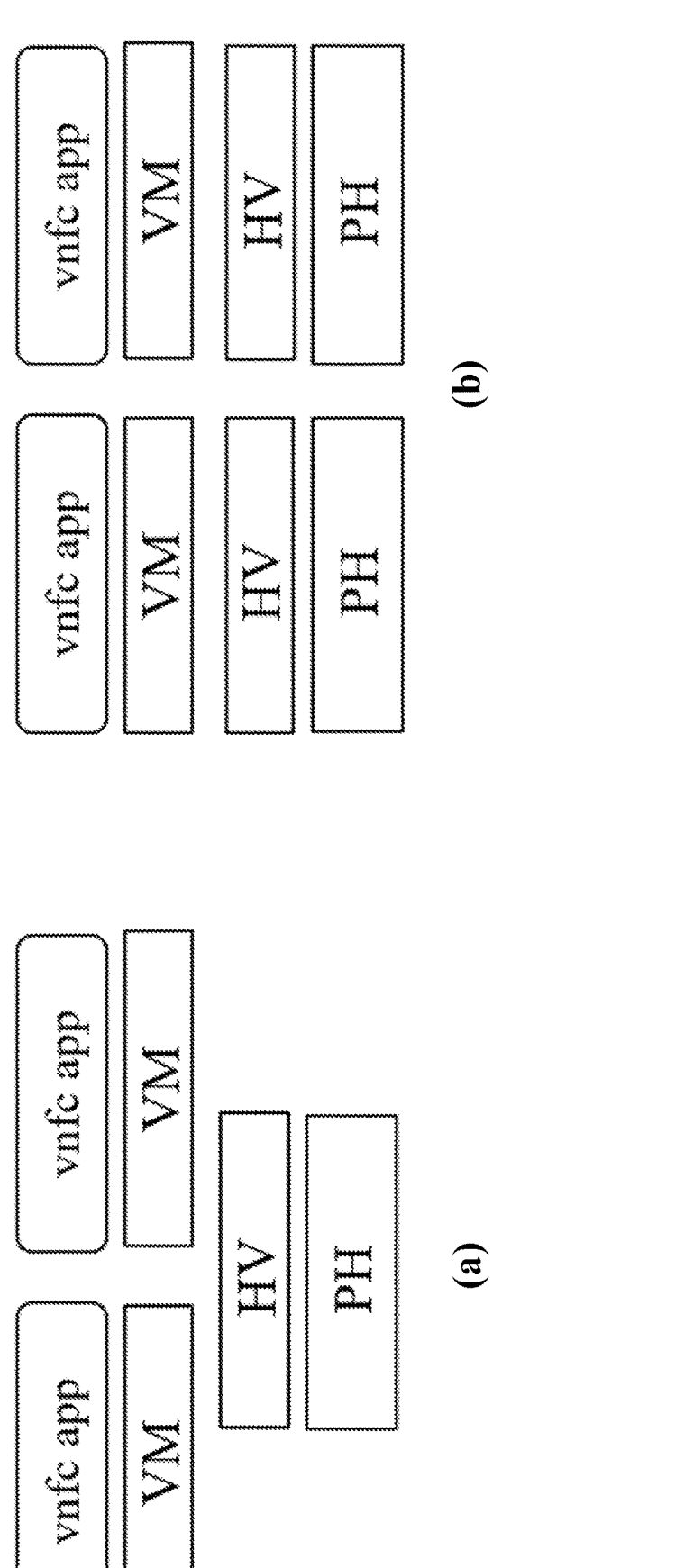
FIGS. 1a and b are schematic illustrations of the placement of two instances of a VNFC: a) two VNFC instances of the same profile, sharing the same physical host; b) two VNFC instances of the same profile, using different physical hosts.

Various features will now be described with reference to the drawings to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines. Unless otherwise specified, such as in the expression "VNFs constituents", all occurrences of the word "constituent", herein, should be interpreted as meaning "constituent of a VNF instance". Furthermore, occurrences of the word "number" when representing positive integers in the different formulas, should be interpreted as meaning "natural number"

Previous related works addresses the effect of VNF instance placement on VNF/NS availability and/or reliability. Some authors propose solutions to calculate the number of required standby instances for a VNF based on the availability of each VNF instance. However, previous works do not consider that VNF instances may be composed of multiple VNFC and VL instances with/without anti-affinity rules. Therefore, the placement problem at the VNFC and VL level is not addressed.

Also, the impact of VNF scaling (i.e., the dynamic changing of the number of VNFC/VL instances at runtime) on the VNF instance availability is not taken into account. Previous works often assume that each VNF instance is a single entity or single application which is placed on a single host. As a result, these previous works have limited applicability in today's dynamically changing systems such as NFV or clouds in general.

To design an NS that meets a certain availability criterion, one needs to start with determining the availability and failure rate of its constituent VNFs. A VNF instance is composed of different elements, therefore, its availability and failure rate depend on the availability and failure rate of its constituents. The placement of these constituents is controlled by anti-affinity rules while VNF scaling changes the numbers of them, thus both affect the VNF instance characteristics in a non-trivial way.

Herein, methods are proposed to calculate the availability and the failure rate of a VNF instance at a given scaling level considering the placement of its constituents according to the applicable anti-affinity rules, i.e. the distribution of constituents among physical links, physical hosts and nodes and the resulting sharing of these physical resources.

The availability and the failure rate of a VNF instance are calculated for all scaling levels among which the minimum is selected for the availability as the VNF instance availability, and the maximum is selected for the failure rate as the VNF instance failure rate, so that these characteristics of the VNF instance can be guaranteed for any scaling level.

Using the instance availability and failure rate calculated for each VNF in an NS, the NS is designed with appropriate redundancy that can guarantee that the availability criteria is met after deployment at runtime.

The availability and failure rate of VNF instances are used during NS level availability calculations and design to determine the number of VNF instances needed. The proposed methods calculate the availability and failure rate for a given VNF instance deployed on a given infrastructure. The proposed solutions take into consideration the internal redundancy, elasticity, and placement policies of the VNF constituents. Since the availability and failure rate of a VNF instance change due to scaling and due to the different placements of the VNF constituents, the methods of calculation described herein guarantee that the availability and failure rate of the VNF instance will not get worse at runtime considering the given infrastructure. Further context and problem definition are provided below.

According to the definition of availability, the availability of a VNF functionality depends on the outage time of this functionality in a given period. When a VNF instance fails as a whole, two different repair/recovery mechanisms can be employed to restore the functionality it was providing: failover or restart recovery. The failover mechanism requires redundancy: once the failure is detected, another (a standby) VNF instance becomes active to provide the (portion of) functionality of the failed instance, while the failed VNF instance is restarted. Thus, the outage time of the (portion of) functionality provided by the failed VNF instance depends on the failure detection time, the failover time, and the number of failures during a given period. Without redundancy, the restart recovery is used: after detecting a failure, the failed VNF instance is restarted, and the functionality is recovered by this restarted VNF instance. In this case, the outage time of the (portion of) functionality this VNF instance provides depends on the failure rate, the failure detection time, and the restart time of the VNF instance. Therefore, for both cases (i.e., the failover and restart recovery mechanisms), the failure rate of VNF instances is an important parameter to be calculated.

In case of redundancy, the functionality provided by a VNF instance is protected by the failover mechanism. The required number of standby instances and the overall availability of the redundant VNF instances are calculated using the availability of the VNF instances. Thus, the availability of each VNF instance needs to be calculated.

A VnfDF, among others, defines the scaling levels of a VNF, which indicates the number of instances for each VNFC and IntVL of the VNF at the different scaling levels. The number of scaling levels is finite and the number of instances for each scaling level may be indicated explicitly or by a delta. In the latter case, the initial number of instances and the amount of change between consecutive scaling levels is indicated (i.e., aspectDeltaDetails attribute). The upper bound for the scaling steps is also set (i.e., maxScaleLevel attribute) to limit the number of scaling levels. Since the number of instances for the VNFCs and/or IntVLs changes at VNF scaling, the availability and failure rate of the composed VNF instance may change as well. Therefore, a solution for determining the availability and failure rate of VNF instances needs to consider the impact of VNF scaling.

Affinity and/or anti-affinity rules can be applied to instances of the same or different VNFCs. However, usually, anti-affinity rules are applied to instances of the same VNFC to place them on different physical hosts to prevent the simultaneous failure of multiple/all instances due to physical host failure, or to limit the number of instances sharing the same host, for example, to support non-disruptive upgrades. Affinity rules, on the other hand, are usually applied to instances of different VNFCs to place them on the same host when they depend on each other and need frequent communication. Multiple affinity and/or anti-affinity rules can be specified for a VNFC or a IntVL. Every rule includes a property which determines the scope of the rule. Possible scopes include: NFVI-PoP (i.e., NFV Infrastructure Point of Presence), ZoneGroup (i.e., multiple zones grouped together), Zone, and Node (i.e., physical host). Herein, only the anti-affinity rules defined for VNFC/IntVL instances at the Node scope, i.e., distribution across multiple nodes inside a Zone are considered.

The degree of sharing physical hosts affects the availability and failure rate of VNFC instances since the availability of a VNFC instance is derived from the availability of the VNFC application and the availability of the underlying infrastructure. In turn, this affects the availability and the failure rate of the functionality provided by the VNF instance.

Accordingly, novel methods are proposed to calculate the availability and failure rate for a given VNF instance deployed on a given infrastructure. The proposed solutions take into consideration the internal redundancy, elasticity, and placement policies of the VNF constituents.

The availability and failure rate of VNF instances, as mentioned previously, are used during NS level availability calculations and design when determining the number of VNF instances needed based on their outage time. Since the availability and failure rate of a VNF instance may change due to scaling and due to the different placements of the VNF constituents, the calculations herein aim at determining the worst-case. This way, it can be guaranteed that the availability and failure rate of the VNF instance will not get worse at runtime considering the given infrastructure.

VNF instance availability is now discussed.

A VNF instance is available if at least one instance of each VNFC and IntVL is available. Therefore, if $A_{VNFC}$ denotes the availability of a VNFC (i.e., at least one instance of the VNFC is available) and $A_{IntVL}$ denotes the availability of an IntVL (i.e., at least one instance of the IntVL is available), the availability of a VNF instance ($A_{vnf}$) with q VNFCs and m IntVLs is:

$$A_{vnf} = \prod_{i=1}^{q} A_{VNFC_i} * \prod_{j=1}^{m} A_{IntVL_j} \qquad (1)$$

The $A_{VNFC}$ and the $A_{IntVL}$ depend on the number of their instances and their placement regarding the anti-affinity rules, which are different at the different scaling levels. How these factors affect the availability of the VNFC and the IntVL is discussed below and then, a method of calculating the availability of VNF instances is proposed.

Availability of VNFCs, $A_{VNFC}$, is derived from the availability of the VNFC instances ($A_{vnfc}$). The $A_{vnfc}$ depends on the availability of the application ($A_{vnfc-app}$) and the availability of the underlying infrastructure. With respect to the latter, assuming one layer of virtualization (i.e., a bare-metal hypervisor), the $A_{vnfc}$ depends on the availability of the virtual machine ($A_{VM}$), the availability of the underlying hypervisor ($A_{HV}$), and the availability of the physical host ($A_{PH}$).

The $A_{VNFC}$ depends also on the placement of its instances. For example, assuming a VNFC that has two instances, there are two cases of placement: in one, the VNFC instances share the same physical host (FIG. 1-*a*); in the other, each VNFC instance is placed on a different physical host (FIG. 1-*b*).

The availability of the VNFC for this example in case of FIG. 1-*a* is:

$$A_{VNFC}=A_{PH}*A_{HV}*(1-(1-A_{VM}*A_{vnfc-app})^2) \qquad (2)$$

In other words, the VNFC is available if the physical host (PH) and the hypervisor (HV) are both available and at least one of the VNFC application (vnfc app) instances and its corresponding virtual machine (VM) are available. In Equation (2), it is assumed that the VMs are of the same type/flavor and have the same availability.

When each VNFC instance is placed on a different PH (FIG. 1-*b*), the VNFC is available if at least one of the VNFC application instances and its corresponding VM, HV, and PH are available. Therefore, $A_{VNFC}$ will be:

$$A_{VNFC}=1-(1-A_{PH}*A_{HV}*A_{VM}*A_{vnfc-app})^2 \qquad (3)$$

In Equation (3), it is assumed that the PHs, HVs, and VMs are of the same type/flavor and have the same availability.

Thus, to calculate the availability of the VNFCs, the placement of its instances is considered, which is guided by the applicable anti-affinity rules. If no anti-affinity rule is applied to a VNFC, in the worst case, all the instances can be placed on the same host. The availability of a VNFC with n instances in the worst-case is calculated according to Equation (4) which is a generalization of Equation (2):

$$A_{VNFC}=A_{PH}*A_{HV}*(1-(1-A_{VM}*A_{vnfc-App})^n) \qquad (4)$$

In case of an anti-affinity rule, all VNFC instances may need to be placed on different hosts. In this case, the availability of the VNFC with n instances is a generalization of Equation (3) as shown in Equation (5):

$$A_{VNFC}=1-(1-A_{PH}*A_{HV}*A_{VM}*A_{vnfc-App})^n \qquad (5)$$

There are also cases in which some (more than one but not all) instances of a VNFC share the same host. An anti-affinity rule may allow a degree of host sharing (d). In addition, there may be a boundary (b) for the number of collocated VMs on a host due to the capacity limitations of hosts, even if there is no anti-affinity rule. To cover these different cases, k is defined to denote the effective constraint for the number of VNFC instances that can share a host. The value of k for the different cases is:

$$k = \begin{cases} n, \text{ if (no anti\_affinity rule) and } (b \geq n) & (6) \\ b, \text{ if (no anti\_affinity rule) and } (b < n) \\ 1, \text{ if (no anti\_affinity rule) and } (d \text{ is not present}) \\ b, \text{ if (no anti\_affinity rule) and } (d \geq b) \text{ and } (b < n) \\ n, \text{ if (no anti\_affinity rule) and } (d \geq b) \text{ and } (b \geq n) \\ d, \text{ if (no anti\_affinity rule) and } (d < b) \text{ and } (d < n) \\ n, \text{ if (no anti\_affinity rule) and } (d < b) \text{ and } (d \geq n) \end{cases}$$

In the worst case, the number of VNFC instances that can share the same host is k. Therefore, there will be g=[n/k] groups of VNFC instances where each group is placed on a separate host. Assuming that the instances are distributed evenly (e.g., in a round-robin manner) among g hosts, n−g*(k−1) groups will have k instances and g*k−n groups will have k−1 instances. Therefore, the availability of the VNFC is:

$$A_{VNFC} = 1 - \left(1 - A_{PH} * A_{HV} * \left(1 - (1 - A_{VM} * A_{vnfc-App})^k\right)\right)^{n-g+(k-1)} * \qquad (7)$$

$$\left(1 - A_{PH} * A_{HV} * \left(1 - (1 - A_{VM} * A_{vnfc-App})^{k-1}\right)\right)^{g+k-n}$$

In other words, the VNFC is available if at least one VNFC instance (i.e., VNFC application and the VM) of one group and its corresponding HV and PH are available. Equation (7) supports all cases of k of Equation (6) and generalizes Equations (4) and (5) as well (i.e., k=n and k=1).

Availability of internal VLs is now discussed.

Similar to VNFCs, an IntVL may have more than one instance. The redundant instances may be used for load balancing or high availability. Redundant instances of an IntVL connect to the VNFC instances using the same virtual Internet Protocol (IP) address. The functionality (i.e., either load balancing or high availability) of the virtual IP address determines the usage of the connected IntVL instances. Whether the redundant instances of an IntVL are used for load balancing or high availability, the IntVL is assumed to fail if all instances fail simultaneously. If only some instances fail, for the former case, there is service degradation. For the latter case, if an active instance fails, a failover is performed, while if a standby instance fails, it is repaired. A VnfDF may include anti-affinity rules for IntVLs.

Assuming that an IntVL instance is an overlay network on top of the physical network (not nested overlay networks), the availability of one IntVL instance is equal to the availability of the network elements (i.e., physical links and nodes) that create the virtual link. If no anti-affinity rule is applied to an IntVL, in the worst case, the availability of its instances may not be independent. In fact, in the worst case, all instances of an IntVL can share partially or completely the same physical network, and when one IntVL instance fails due to a failure at the physical network layer, all instances may fail. Thus, in the worst case where all redundant instances of an IntVL share the same physical network, the availability of the IntVL ($A_{IntVL}$) is equal to the availability of one of its instances ($A_{intvl}$).

$$A_{IntVL} = A_{intvl} \qquad (8)$$

If an anti-affinity rule is defined for an IntVL, the failures of its different instances are independent since they do not share the same physical network.

Therefore, for an IntVL with r (redundant) instances, $A_{IntVL}$ is defined as:

$$A_{IntVL} = 1 - (1 - A_{intvl})^r \qquad (9)$$

A method for calculating the availability of a VNF instance will now be described.

According to both Equations (7) and (9), the availability of a VNF instance varies with the number of instances, thus, according to the VNF scaling levels.

Therefore, the availability of a VNF instance is considered as the lowest availability calculated ($A_{vnf-min}$) among all scaling levels, which then can be guaranteed.

The following method is proposed to determine the availability of a given VNF instance deployed on a given infrastructure.

---

Method 1: VNF instance availability calculation method

---

Step 1: Set $A_{vnf-min} = 1$
Step 2: For each VNF scaling level, perform steps 2-1 to 2-4
   Step 2-1: Calculate the availability of each VNFC for this scaling level, using Equation (7)
   Step 2-2: Calculate the availability of each IntVL for this scaling level
     • If no anti-affinity rule applies, use Equation (8)
     • Otherwise, use Equation (9)
   Step 2-3: Calculate the availability of the VNF instance ($A_{vnf}$), using Equation (1).
   Step 2-4: If $A_{vnf}$ for this scaling level is lower than $A_{vnf-min}$, set $A_{vnf-min} = A_{vnf}$

---

In Method 1, the final value of $A_{vnf-min}$ represents the guaranteed minimum availability of the VNF instance.

VNF instance failure rate will now be discussed.

A VNF instance fails if all (redundant) instances of at least one of its VNFCs or IntVLs have failed at the same time. Therefore, the failure rate of a VNF instance ($\lambda_{vnf}$) with q VNFCs and m IntVLs is the summation of the failure rates of its VNFCs ($\lambda_{VNFC}$) and IntVLs ($\lambda_{IntVL}$), as shown in Equation (10).

$$\lambda_{vnf} = \sum_{i=1}^{q} \lambda_{VNFC_i} + \sum_{j=1}^{m} \lambda_{IntVL_j} \qquad (10)$$

The $\lambda_{VNFC}$ and $\lambda_{IntVL}$ for each VNFC and IntVL depend on the number of their instances at different scaling levels and their placement, as determined by their anti-affinity rules. Hereinbelow, the factors that affect the VNFC and IntVL failure rates are explored. Then, a method to calculate the guaranteed maximum for the failure rate of a VNF instance considering all scaling levels is proposed.

The failure rate of a VNFC depends on the failure rate of its instances, which in turn depends on the failure rates of the VNFC application ($\lambda_{vnfc-app}$), the VM ($\lambda_{VM}$), the underlying hypervisor ($\lambda_{HV}$), and the physical host ($\lambda_{PH}$). The placement of VNFC instances also affects the failure rate of the VNFC. For example, let us consider the two cases presented in FIG. 1 and assume that the failure rate of the VNFC application instances, the VMs, and the hypervisors is zero. Therefore, the failure rate of the VNFC depends only on the failure rate of the physical host(s). So, when both instances are placed on the same host (FIG. 1-a), the VNFC fails if the physical host fails. However, when the two instances are hosted on different physical hosts (FIG. 1-b), the VNFC fails only if both physical hosts fail at the same time—which is less likely than in the former case.

As mentioned previously, if the instances of a VNFC are not anti-affine, in the worst case, all of them may share the same host. Also, there may be a boundary (b) for the number of collocated VMs on a host due to the capacity limitations of the hosts. In case of anti-affinity, the instances do not share physical hosts, or the degree of host sharing is constrained (d).

To calculate the failure rate of a VNFC based on the failure rate of the VNFC application, VM, HV, and PH layers, and the placement of instances, the relationship between reliability (R) and failure rate ($\lambda$) can be used.

The reliability of a system is defined as the probability of having a failure-free service during a given period. The reliability of a system ($R_{Sys}$) for a period of t is calculated using Equation (11).

$$R_{Sys} = e^{-\lambda * t} \qquad (11)$$

So, the reliability of a VNFC can be calculated first, based on the reliability of its components at the different layers and then, the failure rate of the VNFC can be calculated using its reliability.

Fault Tree Diagrams (FTD) can be used to calculate the reliability of a software system with multiple components. Different algorithms/tools have been proposed in the literature to analyze FTDs. An FTD can be constructed from two basic gates, which connect input events (i.e., failures) to output events:

AND gate: output event happens if the input events occur together;

OR gate: output event happens if at least one input event occurs.

For example, FIG. 2-a depicts a system with two components (A and B) that fails if both components fail simultaneously. FIG. 2-b depicts a system that fails if any of its two components fail. In this picture, $F_A$ denotes the failure event of component A, and $F_B$ denotes the failure event of component B.

The reliability of a system with the FTD of FIG. 2-*a* is calculated using the following Equation:

$$R_{Sys} = R_A + R_B - R_A * R_B \qquad (12)$$

If n>2 events are connected to an AND gate, the FTD can be reconstructed using n−1 number of AND gates and the reliability of two components/subsystems with each gate can be calculated. For example, if a system has three components (A, B, and C), it fails if all components fail at the same time, as depicted in FIG. 3-*a*. This FTD can be reconstructed with two gates as shown in FIG. 3-*b*.

Assuming that the reliability of these three components is the same ($R_{cmp}=R_A=R_B=R_C$), applying Equation (12) to the FTD of FIG. 3-*b*, the reliability of the system will be:

$$R_{Sys} = 3R_{cmp} - 3R_{cmp}^2 + R_{cmp}^3 \qquad (13)$$

Equation (13) can be rewritten as Equation (14) and generalized to Equation (15), for a system with n components that fails if all components fail at the same time.

$$R_{Sys} = \binom{3}{1}R_{cmp}^1 - \binom{3}{2}R_{cmp}^2 + \binom{3}{3}R_{cmp}^3 \qquad (14)$$

$$R_{Sys} = \sum_{i=1}^{n}(-1)^{i-1} * \binom{n}{i} * R_{cmp}^i \qquad (15)$$

For a system with FTD of FIG. 2-*b*, the reliability can be calculated using the following Equation:

$$R_{Sys} = R_A * R_B \qquad (16)$$

If n>2 events are connected to an OR gate, the FTD can be reconstructed using n−1 number of OR gates and the reliability of two components/subsystems with each gate can be calculated. For example, a system with three components fails if at least one component fails, as depicted in FIG. 4-*a*, the FTD can be reconstructed with two gates as shown in FIG. 4-*b*.

Applying Equation (16) to the FTD of FIG. 4-*b*, the reliability of the system will be:

$$R_{Sys} = (R_A * R_B) * R_C \qquad (17)$$

To generalize Equation (17), if a system with n components fails due to one component failure, the system reliability is the product of the reliability of its components, as shown in Equation (18):

$$R_{Sys} = \prod_{i=1}^{n} R_{cmp_i} \qquad (18)$$

Equations (15) and (18) can be used to calculate VNFCs reliability for the cases introduced earlier.

Figure 5:
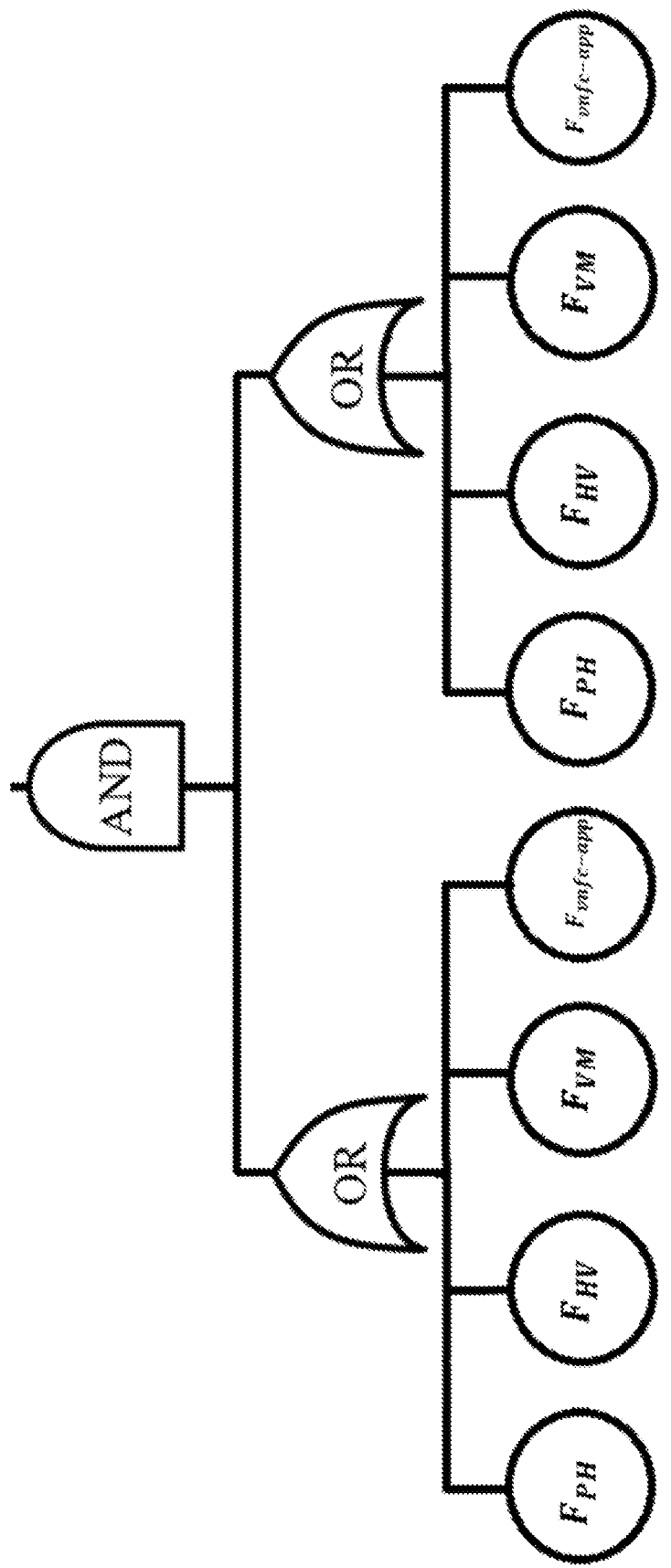
FIG. 5 is a fault tree diagram of the VNFC in FIG. 1-b.

The FTD of the example in FIG. 1-*b* is shown in FIG. 5. Using Equations (15) and (18), the reliability of this VNFC is:

$$R_{VNFC} = \sum_{i=1}^{2}(-1)^{i-1} * \binom{2}{i} * (R_{PH} * R_{HV} * R_{VM} * R_{vnfc-app})^i \qquad (19)$$

In general, for a VNFC with n anti-affine instances without any degree of host sharing, the reliability will be:

$$R_{VNFC} = \sum_{i=1}^{n}(-1)^{i-1} * \binom{n}{i} * (R_{PH} * R_{HV} * R_{VM} * R_{vnfc-app})^i \qquad (20)$$

Figure 6:
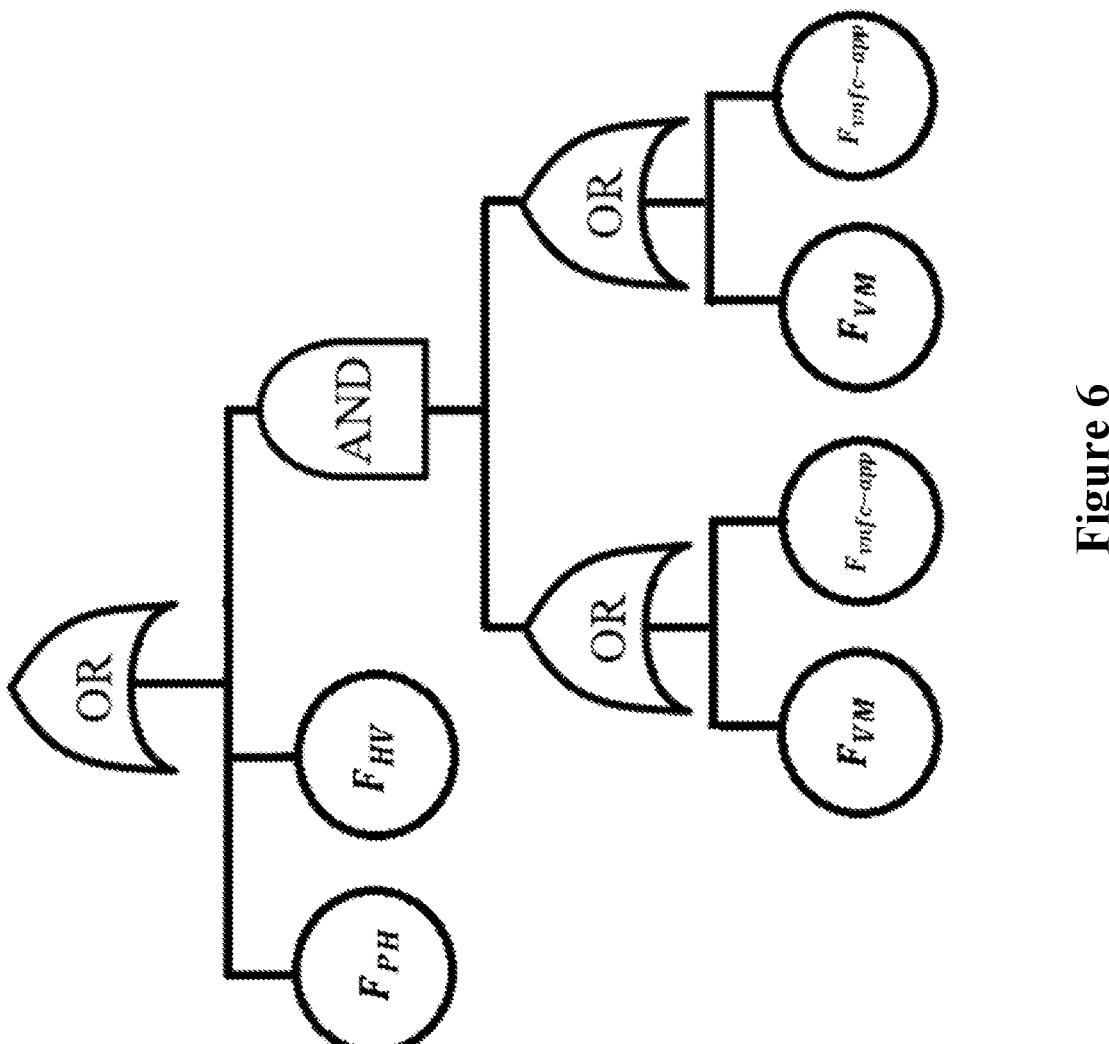
FIG. 6 is a fault tree diagram of the VNFC in FIG. 1-a.

The FTD of the VNFC presented in FIG. 1-*a* is shown in FIG. 6. Using Equations (15) and (18), the reliability of this VNFC is:

$$R_{VNFC} = R_{PH} * R_{HV} * \sum_{i=1}^{2}(-1)^{i-1} * \binom{2}{i} * (R_{VM} * R_{vnfc-App})^i \qquad (21)$$

Therefore, for a VNFC with n instances that share the same host, the reliability is:

$$R_{VNFC} = R_{PH} * R_{HV} * \sum_{i=1}^{n}(-1)^{i-1} * \binom{n}{i} * (R_{VM} * R_{vnfc-App})^i \qquad (22)$$

As mentioned earlier, if an anti-affinity rule allows a degree of host sharing (d), or if there is a boundary (b) for the number of collocated VMs on a host, some degree of host sharing (k) may be possible between the instances of the VNFC. The value of k can be found using Equation (6). Also, in the worst case, there are g=[n/k] groups of VNFC instances, n−g*(k−1) groups with k instances and g*k−n groups with k−1 instances for even/round-robin placement. Therefore, the reliability of a VNFC, in general, is:

$$R_{VNFC} = \left(R_{PH} * R_{HV} * \sum_{i=1}^{k}(-1)^{i-1} * \binom{k}{i} * (R_{VM} * R_{App})^i\right)^{n-g*(k-1)} * \left(R_{PH} * R_{HV} * \sum_{i=1}^{k-1}(-1)^{i-1} * \binom{k-1}{i} * (R_{VM} * R_{App})^i\right)^{g*k-n} \qquad (23)$$

Equation (23) generalizes all the previously discussed cases for calculating the reliability of a VNFC ($R_{VNFC}$). Using Equation (11) and (23), the VNFC failure rate ($\lambda_{VNFC}$) can be calculated, which is:

$$\lambda_{VNFC} = -\frac{\ln R_{VNFC}}{t} \qquad (24)$$

Failure rate of internal VLs will now be discussed.

As mentioned previously, an IntVL is assumed to fail if all its instances fail simultaneously. Like in the case of the calculation of the failure rate of VNFCs, the failure rate of InfVLs can be calculated based on their reliability. Assuming that an IntVL instance is an overlay network on top of the physical network (not nested overlay networks), the reliability of one IntVL instance is equal to the reliability of its undelaying physical network (i.e., physical links and nodes). Therefore, if no anti-affinity rule is applied to an IntVL, in the worst case, any physical layer failure causing a failure for an IntVL instance may lead to the failure of all IntVL instances that are sharing partially or completely the same physical network. Thus, in the worst case, the reliability of the IntVL ($R_{IntVL}$) is equal to the reliability of one of its instances ($R_{intvl}$).

$$R_{IntVL} = R_{intvl} \qquad (25)$$

If an anti-affinity rule is defined for an IntVL, the reliability of its instances is independent. Therefore, for an IntVL with r redundant instances:

$$R_{IntVL} = \sum_{i=1}^{r} (-1)^{i-1} * \binom{n}{i} * R_{intvl}^{i} \qquad (26)$$

In Equations (25) and (26), it is assumed that the reliability is the same for all instances of the IntVL.

Therefore, the failure rate of an IntVL ($\lambda_{IntVL}$) is calculated as follows:

$$\lambda_{IntVL} = -\frac{lnR_{intVL}}{t} \qquad (27)$$

A method for calculating the failure rate of a VNF instance is presented below.

The failure rate of a VNF instance at one scaling level can be calculated using Equations (10, 24, and 27). However, the number of VNFC and/or IntVL instances changes for the different VNF scaling levels. As a result, the reliability of the VNF instance changes according to the VNF scaling. Therefore, a VNF instance failure rate ($\lambda_{vnf-max}$) is defined as the guaranteed maximum among the failure rates of all its scaling levels.

The following method is proposed to determine the failure rate of a given VNF instance. It is assumed that the reliability or failure rate of VNFC applications, VMs, HV, PH, and IntVLs are given.

---

Method 2: VNF instance failure rate calculation method

Step 1: Set $\lambda_{vnf-max} = 0$
Step 2: For each VNF scaling level, perform steps 2-1 to 2-6
  Step 2-1: Calculate the reliability of each VNFC for this scaling level using Equation (23)
  Step 2-2: Calculate the failure rate of each VNFC for this scaling level using Equation (24)
  Step 2-3: Calculate the reliability of each IntVL for this scaling level
    • If no anti-affinity rule is applied, use Equation (25)
    • Otherwise, use Equation (26)
  Step 2-4: Calculate the failure rate of each IntVL for this scaling level using Equation (27)
  Step 2-5: Calculate the failure rate of the VNF instance ($\lambda_{vnf}$) for this scaling level using Equation (10)
  Step 2-6: If $\lambda_{vnf}$ for this scaling level is higher than $\lambda_{vnf-max}$, set $\lambda_{vnf-max} = \lambda_{vnf}$

---

In Method 2, the final value of $\lambda_{vnf-max}$ represents the guaranteed maximum failure rate of the VNF instance.

The methods and formulas provided above can be used to design and deploy an NS. To design an NS which meets given availability requirements, the availability and failure rate of its constituent VNFs are necessary as input.

To calculate the availability and failure rate of a VNF instance, first its availability and failure rate are calculated for each of its scaling level considering the number and the placement of the different constituents according to the applicable anti-affinity rules.

For the availability of a VNF instance the minimum is taken among all the availability values calculated for the different scaling levels of the VNF.

For the failure rate of a VNF instance the maximum is selected among all the failure rate values calculated for the different scaling levels of the VNF.

Then, using the selected availability and failure rate of each VNF composing an NS, the NS is designed and deployed to meet the required availability requirements.

FIG. 7 illustrates a method 700 for designing and deploying a network service (NS) meeting availability requirements. The method comprises computing, step 702, availabilities and failure rates of virtual network functions (VNFs) instances available for deploying the NS. The method comprises designing, step 704, the NS by defining redundancy and placement of constituents of VNFs instances, using the computed availabilities and failure rates of the VNFs instances. The method comprises deploying, step 706, the NS.

Computing the availabilities and failure rates of the VNFs instances may comprise computing, step 708, for each VNF instance, the availabilities and failure rates of the constituents of VNF instance for each scaling level in accordance with applicable anti-affinity rules and boundary constraints that determine the placement of the constituents of the VNFs instances.

There is a finite number of scaling levels on which the algorithm loops when computing availabilities and failure rates. For each scaling level, which determines the numbers of different constituents, the placement determines how many of each of these different constituents may be placed together in the worst case. Considering the availability that this worst case can provide, a certain availability can be guarantee. This calculation does loop on the different VNF instance constituents, but only to take into account each VNF instance constituent for the worst-case calculation.

Let's take as an example a case in which there are 3 scaling levels for a VNF with 5 constituents, which have different number of instances for each level, i.e. scale level 1 {n11, n12, n13, n14, n15}, scale level 2 {n21, n22, n23, n24, n25}, scale level 3 {n31, n32, n33, n34, n35}. For scaling level 1 there is a calculation for the placement of each constituent with {n11, n12, n13, n14, n15} and there is a calculation for the availability A1 and failure rate FR1. The exact equation used for each constituent is determined by the corresponding anti-affinity rule.

For scaling level 2, the same calculations are done, but with {n21, n22, n23, n24, n25} for A2 and FR2. For scaling level 3, the same calculations are done, but with {n31, n32, n33, n34, n35} for A3 and FR3. Finally, the minimum of (A1, A2, A3) is selected as the availability of the VNF, and the maximum of (FR1, FR2, FR3) is selected as the VNF failure rate.

In the method, the applicable anti-affinity rules may comprise rules governing sharing of physical resources by defining a distribution of constituents among the physical resources. The physical resources may comprise physical links, physical hosts and nodes.

Designing the NS may further comprise selecting, step 710, a minimum computed availability among the availabilities computed for each scaling level of the VNF instance and selecting, step 714, a maximum failure rate among the failure rates computed for each scaling level of the VNF instance thereby guaranteeing a given availability of the VNF instance for any scaling level.

Selecting the minimum availability among the availabilities computed for each scaling level of the VNF instance may comprise, iteratively, step 712, for each scaling level, computing an availability of each of a plurality of VNF components (VNFCs) for the scaling level, computing an availability of each of a plurality of internal virtual links (IntVLs) for the scaling level and computing an availability of the VNF instance for the scaling level, and may comprise selecting the minimum availability among the availabilities computed for each scaling level.

The availability, $A_{VNFC}$, of each of the plurality of VNF components (VNFCs) for the scaling level may be computed using:

$$A_{VNFC} = 1 - \left(1 - A_{PH} * A_{HV} * \left(1 - (1 - A_{VM} * A_{vnfc-App})^k\right)\right)^{n-g*(k-1)} *$$
$$\left(1 - A_{PH} * A_{HV} * \left(1 - (1 - A_{VM} * A_{vnfc-App})^{k-1}\right)\right)^{g*k-n}$$

where $A_{PH}$ is an availability of a physical host, $A_{HV}$ is an availability of a hypervisor, $A_{VM}$ is an availability of a virtual machine on which the VNFC is instantiated, $A_{vnfc}$ is the availability of a VNFC instance, $A_{vnfc-App}$ is an availability of an application, k is a number of VNFC instances that can share a same host, n is a number of VNFC instances for the scaling level and g is a number of hosts.

The variable k may be defined as:

$$k = \begin{cases} n, & \text{if (no anti\_affinity rule) and } (b \geq n) \\ b, & \text{if (no anti\_affinity rule) and } (b < n) \\ 1, & \text{if (an anti\_affinity rule) and } (d \text{ is not present}) \\ b, & \text{if (an anti\_affinity rule) and } (d \geq b) \text{ and } (b < n) \\ n, & \text{if (an anti\_affinity rule) and } (d \geq b) \text{ and } (b \geq n) \\ d, & \text{if (an anti\_affinity rule) and } (d < b) \text{ and } (d < n) \\ n, & \text{if (an anti\_affinity rule) and } (d < b) \text{ and } (d \geq n) \end{cases}$$

where b is a boundary for a number of collocated VMs on a host due to capacity limitations of hosts, and d is an allowed degree of host sharing according to anti-affinity rules.

The availability, $A_{IntVL}$, of each of the plurality of internal virtual links (IntVLs) for the scaling level may be computed using:

$A_{IntVL} = A_{intvl}$ if no anti-affinity rule applies; and $A_{IntVL} = 1 - (1 - A_{intvl})^r$ otherwise;

where $A_{intvl}$ is an availability of one instance of IntVL, and r is a total number of IntVL instances.

The availability $A_{vnf}$ of the VNF instance for the scaling level may be computed using:

$$A_{vnf} = \prod_{i=1}^{q} A_{VNFC_i} * \prod_{j=1}^{m} A_{IntVL_j}$$

where q is a total number of VNFCs and m is a total number of IntVLs.

Selecting the maximum failure rate among the failure rates computed for each scaling level of the VNF instance may comprise, iteratively, step 716, for each scaling level, computing a reliability of each of a plurality of VNF components (VNFCs) for the scaling level, computing a failure rate of each of the plurality of VNFCs for the scaling level, computing a reliability of each of a plurality of internal virtual links (IntVLs) for the scaling level, computing a failure rate of each of the plurality of IntVLs for the scaling level and computing a failure rate of the VNF instance for the scaling level, and may comprise selecting the maximum failure rate among the failure rates computed for each scaling level.

The reliability, $R_{VNFC}$, of each of a plurality of VNF components (VNFCs) for the scaling level may be computed using:

$$R_{VNFC} = \left(R_{PH} * R_{HV} * \sum_{i=1}^{k} (-1)^{i-1} * \binom{k}{i} * (R_{VM} * R_{App})^i\right)^{n-g*(k-1)} *$$
$$\left(R_{PH} * R_{HV} * \sum_{i=1}^{k-1} (-1)^{i-1} * \binom{k-1}{i} * (R_{VM} * R_{App})^i\right)^{g*k-n}$$

where $R_{PH}$ is a reliability of a physical host, $R_{HV}$ is a reliability of an hypervisor, $R_{VM}$ is a reliability of a virtual machine on which the VNFC is instantiated, $R_{vnfc}$ is the reliability of a VNFC instance, $R_{App}$ is a reliability of an application, k is a number of VNFC instances that can share a same host, n is a number of VNFC instances for the scaling level and g is a number of hosts.

The failure rate $\lambda_{VNFC}$ of each of the plurality of VNFCs for the scaling level may be computed using:

$$\lambda_{VNFC} = -\frac{\ln R_{VNFC}}{t}$$

where t is a time period for which the failure rate is computed.

The reliability $R_{IntVL}$ of each of a plurality of internal virtual links (IntVLs) for the scaling level may be computed using:

$R_{IntVL} = R_{intvl}$ if no anti-affinity rule applies; and $$R_{IntVL} = \sum_{i=1}^{r} (-1)^{i-1} * \binom{r}{i} * R_{intvl}^i \text{ otherwise;}$$

where $R_{intvl}$ is a reliability of one instance of IntVL, and r is a total number of IntVL instances.

The failure rate $\lambda_{IntVL}$ of each of the plurality of IntVLs for the scaling level may be computed using:

$$\lambda_{IntVL} = -\frac{\ln R_{intVL}}{t}$$

where t is a time period for which the failure rate is computed.

The failure rate $\lambda_{vnf}$ of the VNF instance for the scaling level may be computed using:

$$\lambda_{vnf} = \sum_{i=1}^{q} \lambda_{VNFC_i} + \sum_{j=1}^{m} \lambda_{IntVL_j}$$

where q is a total number of VNFCs and m is a total number of IntVLs.

The method may further comprise any of the steps described herein and may use any of the formulas described herein to make the computations described in those steps.

Figure 8:
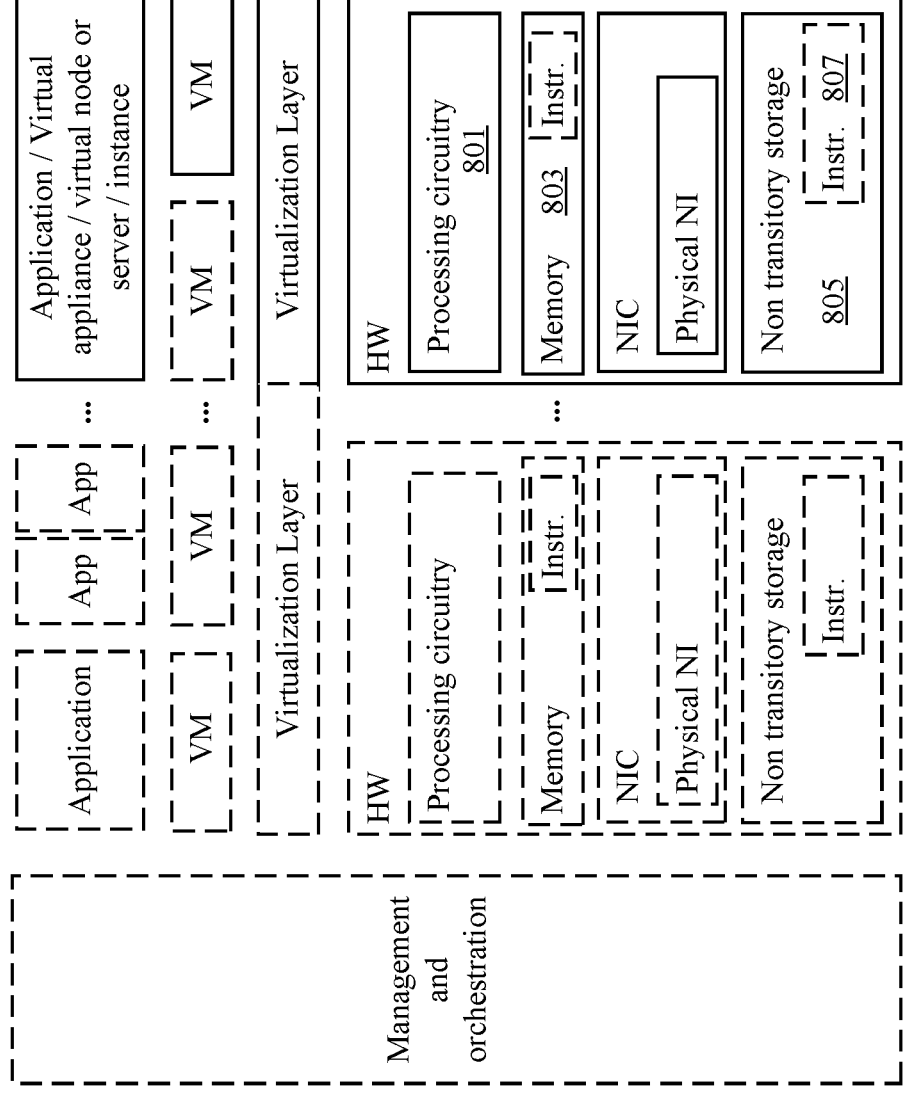
FIG. 8 is a schematic illustration of a virtualization environment in which the different methods and apparatus described herein can be deployed.

Referring to FIG. 8, there is provided a virtualization environment in which functions and steps described herein can be implemented.

A virtualization environment (which may go beyond what is illustrated in FIG. 8), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry 801 and memory 803. The memory can contain instructions executable by the processing circuitry whereby functions and steps described herein may be executed to provide any of the relevant features and benefits disclosed herein.

The hardware may also include non-transitory, persistent, machine readable storage media 805 having stored therein software and/or instruction 807 executable by processing circuitry to execute functions and steps described herein.

There is provided an apparatus (HW in FIG. 8) operative to design and deploy a network service (NS) meeting availability requirements. The apparatus comprises processing circuits 801 and a memory 803, the memory 803 containing instructions executable by the processing circuits 801 whereby the apparatus is operative to compute availabilities and failure rates of virtual network functions (VNFs) instances available for deploying the NS. The apparatus is further operative to design the NS by defining redundancy and placement of constituents of VNFs instances, using the computed availabilities and failure rates of the VNFs instances and to deploy the NS.

The apparatus is further operative to compute, for each VNF instance, the availabilities and failure rates of the VNF instance constituents for each scaling level in accordance with applicable anti-affinity rules and boundary constraints that determine placement of the constituents of the VNFs instances. The applicable anti-affinity rules may comprise rules governing sharing of physical resources by defining a distribution of constituents among the physical resources. The physical resources may comprise physical links, physical hosts and nodes.

The apparatus is further operative to select a minimum computed availability among the availabilities computed for each scaling level of the VNF instance and select a maximum failure rate among the failure rates computed for each scaling level of the VNF instance thereby guaranteeing a given availability of the VNF instance for any scaling level.

The apparatus is further operative, when selecting the minimum availability among the availabilities computed for each scaling level of the VNF instance to, iteratively for each scaling level, compute an availability of each of a plurality of VNF components (VNFCs) for the scaling level, compute an availability of each of a plurality of internal virtual links (IntVLs) for the scaling level, and compute an availability of the VNF instance for the scaling level, and is further operative to select the minimum computed availability among the availabilities computed for each scaling level.

The apparatus is further operative, when selecting the maximum failure rate among the failure rates computed for each scaling level of the VNF instance, to iteratively for each scaling level, compute a reliability of each of a plurality of VNF components (VNFCs) for the scaling level, compute a failure rate of each of the plurality of VNFCs for the scaling level, compute a reliability of each of a plurality of internal virtual links (IntVLs) for the scaling level, compute a failure rate of each of the plurality of IntVLs for the scaling level, and compute a failure rate of the VNF instance for the scaling level, and is further operative to select the maximum failure rate among the failure rates computed for each scaling level.

NS designed with the method described herein can be deployed in a system such as the system illustrated in FIG. 8 or any other suitable system providing capabilities for virtualization. The actual processing of the computations described herein can be executed on a single hardware or in plural distributed hardware depending on the nature of the system and/or depending on how the method is implemented.

There is provided a non-transitory computer readable media 805 having stored thereon instructions 807 for designing and deploying a network service (NS) meeting availability requirements. The instructions 807 comprise any of the steps described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. Although specific terms may be employed herein, they are used in a generic and descriptive sense only and not for purposes of limitation.

The invention claimed is:

1. A method for designing and deploying a network service (NS) meeting availability requirements, comprising:
   computing availabilities and failure rates of virtual network functions (VNFs) instances available for deploying the NS;
   designing the NS by defining redundancy and placement of constituents of VNFs instances, using the computed availabilities and failure rates of the VNFs instances; and
   deploying the NS.

2. The method of claim 1, wherein computing the availabilities and failure rates of the VNFs instances comprises computing, for each VNF instance, the availabilities and failure rates of the VNF instance constituents for each scaling level in accordance with applicable anti-affinity rules and boundary constraints that determine the placement of the constituents of the VNFs instances.

3. The method of claim 2, wherein the applicable anti-affinity rules comprise rules governing sharing of physical resources by defining a distribution of the constituents of the VNFs instances among the physical resources.

4. The method of claim 3, wherein the physical resources comprise physical links, physical hosts and nodes.

5. The method of claim 2, wherein designing the NS further comprises:
   selecting a minimum availability among the availabilities computed for each scaling level of the VNF instance; and
   selecting a maximum failure rate among the failure rates computed for each scaling level of the VNF instance;
   thereby guaranteeing a given availability of the VNF instance for any scaling level.

6. The method of claim 5, wherein selecting a minimum availability among the availabilities computed for each scaling level of the VNF instance comprises:
   iteratively for each scaling level:
   computing an availability of each of a plurality of VNF components (VNFCs) for the scaling level;
   computing an availability of each of a plurality of internal virtual links (IntVLs) for the scaling level; and computing an availability of the VNF instance for the scaling level; and selecting the minimum availability among the availabilities computed for each scaling level.

7. The method of claim 6, wherein the availability, $A_{VNFC}$, of each of the plurality of VNF components (VNFCs) for the scaling level is computed using:

$$A_{VNFC}=1-(1-A_{PH}*A_{HV}*(1-(1-A_{VM}*A_{vnfc-App})^k))^{n-g*(k-1)}*(1-A_{PH}*A_{HV}*(1-(1-A_{VM}*A_{vnfc-App})^{k-1}))^{g*k-n}$$

where $A_{PH}$ is an availability of a physical host, $A_{HV}$ is an availability of a hypervisor, $A_{VM}$ is an availability of a virtual machine on which the VNFC is instantiated, $A_{vnfc}$ is the availability of a VNFC instance, $A_{vnfc-App}$ is an availability of an application, k is a natural number of VNFC instances that can share a same host, n is a natural number of VNFC instances for the scaling level and g is a natural number of hosts.

8. The method of claim 7, wherein:

$$k = \begin{cases} n, \text{ if (no anti\_affinity rule) and } (b \geq n) \\ b, \text{ if (no anti\_affinity rule) and } (b < n) \\ 1, \text{ if (an anti\_affinity rule) and } (d \text{ is not present}) \\ b, \text{ if (an anti\_affinity rule) and } (d \geq b) \text{ and } (b < n) \\ n, \text{ if (an anti\_affinity rule) and } (d \geq b) \text{ and } (b \geq n) \\ d, \text{ if (an anti\_affinity rule) and } (d < b) \text{ and } (d < n) \\ n, \text{ if (an anti\_affinity rule) and } (d < b) \text{ and } (d \geq n) \end{cases}$$

where b is a boundary for a natural number of collocated VMs on a host due to capacity limitations of hosts, and d is an allowed degree of host sharing according to anti-affinity rules.

9. The method of claim 7, wherein the availability, $A_{IntVL}$, of each of the plurality of internal virtual links (IntVLs) for the scaling level is computed using:

$$A_{IntVL}=A_{intvl} \text{ if no anti-affinity rule applies; and}$$

$$A_{IntVL}=1-(1-A_{intvl})^r \text{ otherwise;}$$

where $A_{intvl}$ is an availability of one instance of IntVL, and r is a total natural number of IntVL instances.

10. The method of claim 9, wherein the availability $A_{vnf}$ of the VNF instance for the scaling level is computed using:

$$A_{vnf}=\Pi_{i=1}^{q}A_{VNFC_i}*\Pi_{j=1}^{m}A_{IntVL_j}$$

where q is a total natural number of VNFCs and m is a total natural number of IntVLs.

11. The method of claim 5, wherein selecting a maximum failure rate among the failure rates computed for each scaling level of the VNF instance comprises:

iteratively for each scaling level:

computing a reliability of each of a plurality of VNF components (VNFCs) for the scaling level;

computing a failure rate of each of the plurality of VNFCs for the scaling level;

computing a reliability of each of a plurality of internal virtual links (IntVLs) for the scaling level;

computing a failure rate of each of the plurality of IntVLs for the scaling level; and computing a failure rate of the VNF instance for the scaling level; and selecting the maximum failure rate among the failure rates computed for each scaling level.

12. The method of claim 11, wherein the reliability, $R_{VNFC}$, of each of a plurality of VNF components (VNFCs) for the scaling level is computed using:

$$R_{VNFC} = \left(R_{PH}*R_{HV}*\sum_{i=1}^{k}(-1)^{i-1}*\binom{k}{i}*(R_{VM}*R_{App})^i\right)^{n-g*(k-1)}*$$

$$\left(R_{PH}*R_{HV}*\sum_{i=1}^{k-1}(-1)^{i-1}*\binom{k-1}{i}*(R_{VM}*R_{App})^i\right)^{g*k-n}$$

where $R_{PH}$ is a reliability of a physical host, $R_{HV}$ is a reliability of an hypervisor, $R_{VM}$ is a reliability of a virtual machine on which the VNFC is instantiated, $R_{vnfc}$ is the reliability of a VNFC instance, $R_{App}$ is a reliability of an application, k is a natural number of VNFC instances that can share a same host, n is a natural number of VNFC instances for the scaling level and g is a natural number of hosts.

13. The method of claim 12, wherein the failure rate $\lambda_{VNFC}$ of each of the plurality of VNFCs for the scaling level is computed using:

$$\lambda_{VNFC} = -\frac{\ln R_{VNFC}}{t}$$

where t is a time period for which the failure rate is computed.

14. The method of claim 13, wherein the reliability $R_{IntVL}$ of each of a plurality of internal virtual links (IntVLs) for the scaling level is computed using:

$$R_{IntVL}=R_{intvl} \text{ if no anti-affinity rule applies; and}$$

$$R_{IntVL} = \sum_{i=1}^{r}(-1)^{i-1}*\binom{r}{i}*R_{intvl}^i \text{ otherwise;}$$

where $R_{intvl}$ is a reliability of one instance of IntVL, and r is a total natural number of IntVL instances.

15. The method of claim 14, wherein the failure rate $\lambda_{IntVL}$ of each of the plurality of IntVLs for the scaling level is computed using:

$$\lambda_{IntVL} = -\frac{\ln R_{IntVL}}{t}$$

where t is a time period for which the failure rate is computed.

16. The method of claim 15, wherein the failure rate $\lambda_{vnf}$ of the VNF instance for the scaling level is computed using:

$$\lambda_{vnf} = \sum_{i=1}^{q}\lambda_{VNFC_i} + \sum_{j=1}^{m}\lambda_{IntVL_j}$$

where q is a total natural number of VNFCs and m is a total natural number of IntVLs.

17. An apparatus operative to design and deploy a network service (NS) meeting availability requirements comprising processing circuits and a memory, the memory containing instructions executable by the processing circuits whereby the apparatus is operative to:

compute availabilities and failure rates of virtual network functions (VNFs) instances available for deploying the NS;

design the NS by defining redundancy and placement of constituents of VNFs instances, using the computed availabilities and failure rates of the VNFs instances; and deploy the NS.

18. The apparatus of claim 17, further operative to compute, for each VNF instance, the availabilities and failure rates of the VNF instance constituents for each scaling level in accordance with applicable anti-affinity rules and boundary constraints that determine the placement of the constituents of the VNFs instances.

19. The apparatus of claim 18, wherein the applicable anti-affinity rules comprise rules governing sharing of physical resources by defining a distribution of the constituents of the VMFs instances among the physical resources.

20. The apparatus of claim 19, wherein the physical resources comprise physical links, physical hosts and nodes.

21. The apparatus of claim 18, further operative to:

select a minimum availability among the availabilities computed for each scaling level of the VNF instance; and select a maximum failure rate among the failure rates computed for each scaling level of the VNF instance;

thereby guaranteeing a given availability of the VNF instance for any scaling level.

22. The apparatus of claim 21, further operative, when selecting the minimum availability among the availabilities computed for each scaling level of the VNF instance to, iteratively for each scaling level:

compute an availability of each of a plurality of VNF components (VNFCs) for the scaling level;

compute an availability of each of a plurality of internal virtual links (IntVLs) for the scaling level; and compute an availability of the VNF instance for the scaling level; and select the minimum availability among the availabilities computed for each scaling level.

23. The apparatus of claim 21, further operative, when selecting the maximum failure rate among the failure rates computed for each scaling level of the VNF instance to, iteratively for each scaling level:

compute a reliability of each of a plurality of VNF components (VNFCs) for the scaling level;

compute a failure rate of each of the plurality of VNFCs for the scaling level;

compute a reliability of each of a plurality of internal virtual links (IntVLs) for the scaling level;

compute a failure rate of each of the plurality of IntVLs for the scaling level; and compute a failure rate of the VNF instance for the scaling level; and select the maximum failure rate among the failure rates computed for each scaling level.

24. A non-transitory computer readable media having stored thereon instructions for designing and deploying a network service (NS) meeting availability requirements, the instructions comprising:

computing availabilities and failure rates of virtual network functions (VNFs) instances available for deploying the NS;

designing the NS by defining redundancy and placement of constituents of VNFs instances, using the computed availabilities and failure rates of the VNFs instances; and deploying the NS.

\* \* \* \* \*